G. N. BARRIE & A. P. HANSCOM.
COUPLING.
APPLICATION FILED NOV. 24, 1914.
1,149,491.
Patented Aug. 10, 1915.
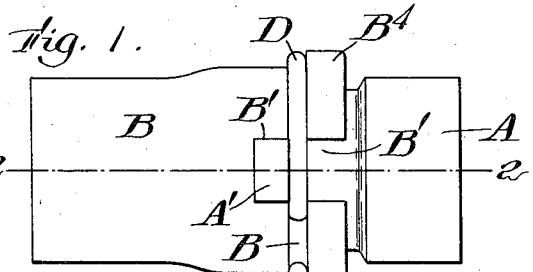
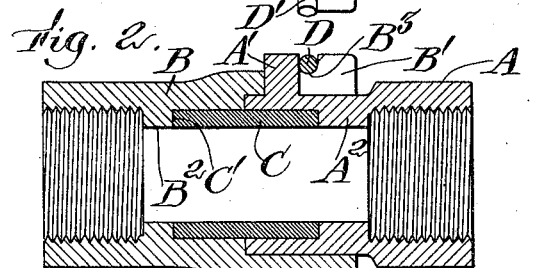
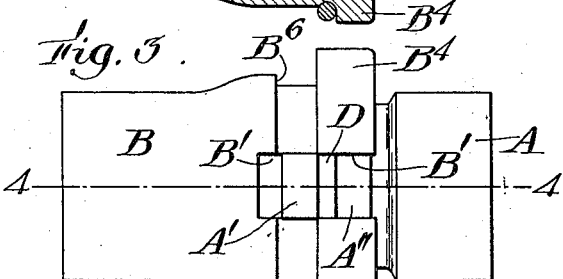
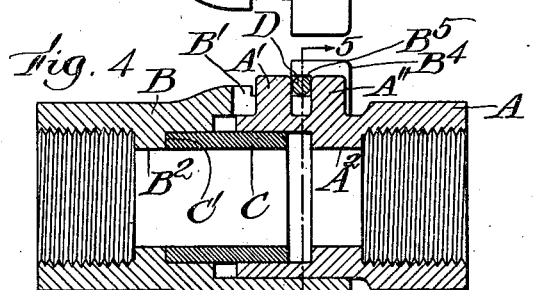
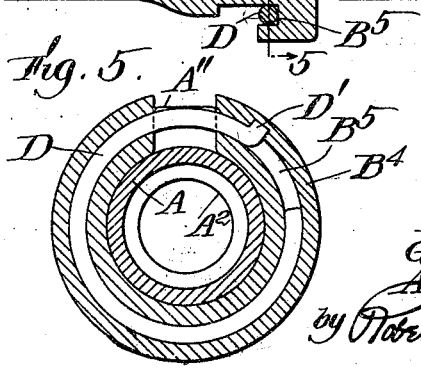
Witnesses:
Inventors:
George N. Barrie,
Adelbert P. Hanscom,
by Roberts, Roberts & Cushman
Attorneys.

UNITED STATES PATENT OFFICE.

GEORGE N. BARRIE, OF BROOKLINE, AND ADELBERT P. HANSCOM, OF WEST MEDFORD, MASSACHUSETTS.

COUPLING.

1,149,491.  Specification of Letters Patent.  Patented Aug. 10, 1915.

Application filed November 24, 1914. Serial No. 873,825.

*To all whom it may concern:*

Be it known that we, GEORGE N. BARRIE, a subject of the King of Great Britain and Ireland, and ADELBERT P. HANSCOM, a citizen of the United States, and residents, respectively, of Brookline, in the county of Norfolk, and West Medford, in the county of Middlesex, both in the State of Massachusetts, have invented new and useful Improvements in Couplings, of which the following is a specification.

Our invention relates to couplings for hose and the like, and consists in devices by which the coupling and uncoupling of hose sections may be quickly and readily accomplished and by which, also, the coupling automatically makes itself liquid tight as soon as pressure is exerted in the interior thereof.

In the drawings hereto annexed,—Figure 1 shows an example of such a coupling in plan view; Fig. 2 shows the coupling of Fig. 1 in longitudinal section along the line 2—2; Fig. 3 shows a plan view of a modified form of the coupling; Fig. 4 shows a longitudinal sectional view on line 4—4 of Fig. 3; and Fig. 5 is a cross section on line 5—5 of Fig. 4.

The example of our invention shown in Figs. 1 and 2 of the drawings comprises two coupling members A and B which are shaped so as to enter into mutually telescoping relationship. The member B is provided with a longitudinal notch B' and the member A with an external lug A', which enters the notch B'. An interrupted ring D which is sprung into the groove B³ in the member B adjacent to flange B⁴ is turned so that its interruption registers with the sides of the notch B' when the lug A' is to be inserted and after the lug is inserted, the ring D, being turned by means of the upturned end D', confines the lug A' in the notch B'. One of the coupling members, in the instance described the member B, has seated in it an expansible tubular section C, preferably composed of rubber, and the end of the telescoping member A when the two coupling members are united, telescopes around and surrounds the expansible section C. In the preferred form of construction the member B has an internal flange B² and the member A an internal flange A² which when alined with the expansible section C form therewith a tubular passage of substantially uniform diameter. The inner flange B² furnishes a seat C' against which the expansible section C is placed. When the members A and B are coupled together, as shown in the drawings, (it being understood that each member is attached to the end of a hose section), and water or other fluid is introduced under pressure, the internal pressure causes the expansible member C to expand against the surrounding telescoping coupling member A with which it therefore makes a liquid tight joint. Another effect of internal pressure is to tend to force the two coupling members A and B apart and this tendency causes the lug A' to bind tightly against the ring D, thus preventing any accidental movement of the ring D in its groove B³.

In the form of the coupling shown in Figs. 3, 4 and 5, provision is made whereby the coupling cannot be unlocked either accidentally or deliberately while it is under pressure. This is important for high pressure service, such as power spraying and fire department work, and particularly when the hose is to be dragged over the ground and the coupling lock might become dislodged. In this form of the coupling the two coupling members A and B and the expansible tube C are substantially the same as in the other form. The flange B⁴, however, is made with an annular recess or groove B⁵ on its inner side, into which the locking ring D will slip and by which it will be wholly covered and protected. The lug A' projects through notch B' and is held in place by the ring D as before. Another external lug A" projects from member A immediately behind lug A', with a channel between the two lugs of sufficient width to receive the ring D. A shoulder or flange B⁶ is provided on member B to prevent the ring D from slipping off when the coupling members are disconnected. To couple the two members together the end of section A is inserted into the end of section B, as before, with the lugs A' and A" in notch B'. The ring D is turned until its gap or break comes opposite to lug A' and the ring is then slipped past A' and turned into the channel between A' and A", with the upturned end D' opposite a corresponding recess in groove B⁵. When pressure is on the coupling and the members tend to expand in a longitudinal direction, the ring D will be forced and held in the groove B⁵, rendering it impossible to take the coupling apart under pressure, and preventing the locking ring from becoming accidentally turned and dislodged by an external blow. When the pressure is relieved and the coupling members are pressed together the lug A″ will push the ring D out of the groove B⁵ so that it may be turned until its interrupted part registers with lug A′ and the members may then be separated. The slot B′ should be made a little longer than in the other form, to permit the members to be moved toward each other for the purpose of uncoupling them in the manner above described.

It will be obvious that the above described coupling will be very easy to couple and uncouple, and that when coupled and in use it will be liquid tight. Renewal of the expansible section C is easily accomplished since all that has to be done is to cut a section of rubber tubing of the right length and size and secure it in the end of section B against the seat C′.

We claim:—

1. In a coupling, a pair of mutually telescoping tubular coupling members, one provided with a longitudinal notch, the other with a lug to enter said notch, a ring interrupted at one point on the notched member, mounted to turn thereon to confine the lug in the notch, an expansible tubular section mounted in one coupling member, the other coupling member telescoping around said expansible tubular section, whereby fluid pressure inside the coupling expands the expansible member against the coupling member surrounding it, to make a tight joint.

2. In a coupling, a pair of mutually telescoping tubular coupling members, one provided with a flange and a longitudinal notch, the other with a lug to enter said notch, a ring on the notched member interrupted at one point and of a diameter not greater than that of said flange, said ring mounted to turn on said notched member to confine the lug in the notch, an expansible tubular section mounted in one coupling member, the other coupling member telescoping around said expansible tubular section, whereby fluid pressure inside the coupling expands the expansible member against the coupling member surrounding it to make a tight joint.

3. In a coupling, a pair of mutually telescoping tubular coupling members, one provided with a flange and a longitudinal notch, and the other with a lug to enter said notch, an interrupted ring on the notched member mounted to turn thereon to confine the lug in the notch, said flange having an annular groove in its inner side adapted to rec    and cover said ring when in locking position, and an expansible tubular section adapted to make tight joint between sai' coupling members.

4. In a coupling, a pair of mutually tele- scoping tubular coupling members, one provided with a flange and a longitudinal notch, and the other with two lugs arranged one behind the other to enter said notch, an interrupted ring on the notched member mounted to turn thereon between said two lugs to confine the lug in the notch, said flange having an annular groove in its inner side adapted to receive and cover said ring when in locking position, and an expansible tubular section adapted to make tight joint between said coupling members.

Signed by us at Boston, Massa.... .tts, this twentieth day of November, 1914.

GEORGE N. BARRIE.
ADELBERT P. HANSCOM.

Witnesses:
ROBERT CUSHMAN,
CHARLES D. WOODBERRY.